(12) United States Patent
Bastard et al.

(10) Patent No.: US 7,942,608 B2
(45) Date of Patent: May 17, 2011

(54) ANCHORING COLLAR

(75) Inventors: Antoine Bastard, Houston, TX (US);
Kevin Legris, Houston, TX (US); Julie Le Pocreau, Houston, TX (US)

(73) Assignee: Technip France (FR)

( * ) Notice: Subject to any disclaimer, the term of this patent is extended or adjusted under 35 U.S.C. 154(b) by 254 days.

(21) Appl. No.: 12/028,190

(22) Filed: Feb. 8, 2008

(65) Prior Publication Data

US 2009/0202305 A1  Aug. 13, 2009

(51) Int. Cl.
*F16L 1/12* (2006.01)

(52) U.S. Cl. ...... 405/172; 405/158; 405/167; 405/168.1

(58) Field of Classification Search ................ 405/158, 405/166, 167, 168.1, 168.2, 168.3, 172, 224
See application file for complete search history.

(56) References Cited

U.S. PATENT DOCUMENTS

| | | | | |
|---|---|---|---|---|
| 4,335,752 A * | 6/1982 | Sumner | .......................... | 138/97 |
| 4,345,854 A | 8/1982 | Valantin | | |
| 4,364,692 A | 12/1982 | Kyriakides et al. | | |
| 4,449,852 A | 5/1984 | Muszynski | | |
| 5,458,441 A * | 10/1995 | Barry | .......................... | 405/170 |
| 5,553,975 A * | 9/1996 | Elkins | .......................... | 405/184.4 |
| 5,988,651 A | 11/1999 | Miyaoh | | |
| 6,513,551 B2 | 2/2003 | Louis et al. | | |
| 2001/0012476 A1* | 8/2001 | Louis et al. | .................. | 405/168.2 |
| 2004/0086339 A1 | 5/2004 | Tyrer et al. | | |
| 2005/0180820 A1 | 8/2005 | Zandwijk | | |
| 2006/0145479 A1 | 7/2006 | McIntyre | | |

OTHER PUBLICATIONS

Notification of Transmittal of the International Search Report and the Written Opinion of the International Searching Authority, or the Declaration dated Mar. 23, 2009; International Search Report; and Written Opinion of the International Searching Authority (9 pages, total).

* cited by examiner

*Primary Examiner* — Tara Mayo-Pinnock
*Assistant Examiner* — Benjamin Fiorello
(74) *Attorney, Agent, or Firm* — Ostrolenk Faber LLP

(57) ABSTRACT

A flowline for hydrocarbon which is capable of being reeled and which is unreeled for being laid on the seabed using the reeled lay method is comprised of successive pipe sections having opposing ends which are joined by an anchor collar that is butt welded to the opposing ends. The pipe sections have a jacket on the exterior of the pipe sections, but the pipe sections are able to be reeled. Anchor collars are affixed by butt welding between the ends of adjacent pipe sections. Each anchor collar has a fixture or protrusion radially outward which has an outer diameter less than or at least not more than the outer diameter of the pipe section jacket. The flowline has the same inner diameter at the pipe sections and the collar, and the pipe has the same outer diameter as the collar, while the protrusion protrudes outward from the exterior of the collar. The flowline is anchored on the seabed by unreeling it from a spool, applying a clamp to the collar before delivering it to the seabed, and anchoring the clamp to the seabed. The jacket may expose the fixture or protrusion or may initially cover it and be removed to enable the clamping.

15 Claims, 3 Drawing Sheets

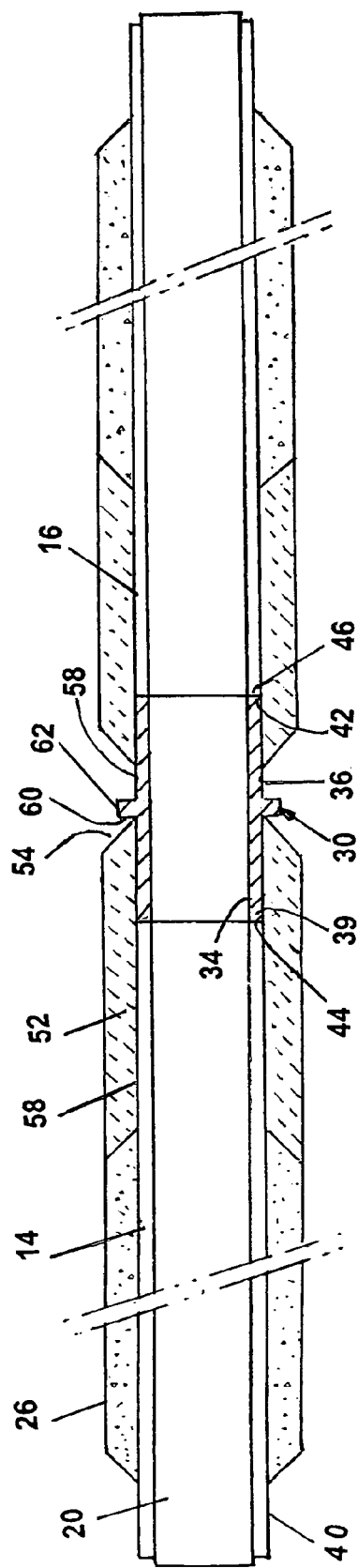
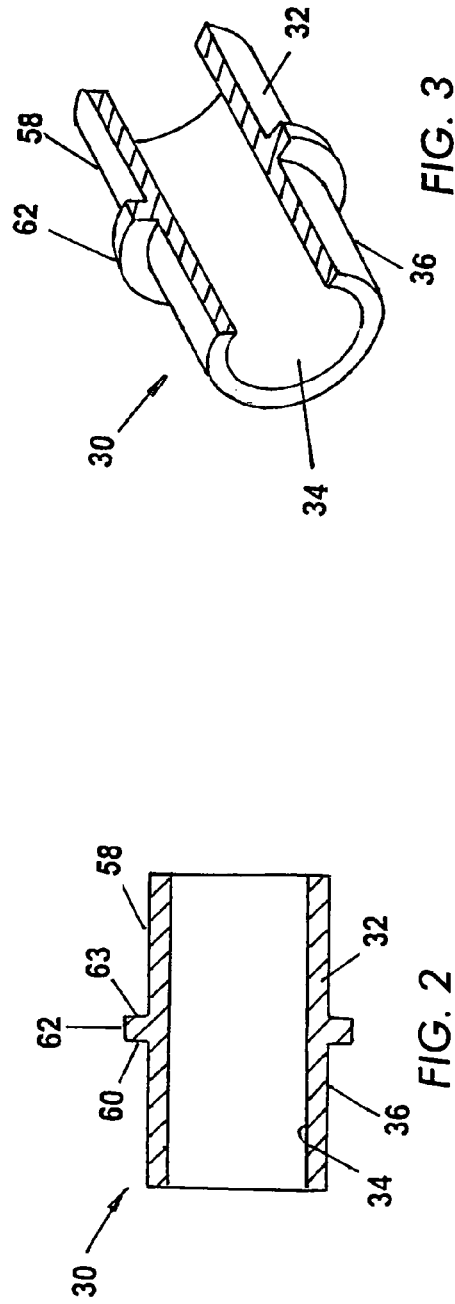
FIG. 1
FIG. 2
FIG. 3

ANCHORING COLLAR

FIELD OF THE INVENTION

The invention relates to a collar on a flowline of a subsea pipeline and the collar is used for anchoring the subsea flowline. More particularly, the flowline to be anchored may be a rigid pipe and may be laid by the reeled lay method. The present invention particularly relates to a "reeled lay method" and to a collar for anchoring such a flowline, although the invention might be adapted to other pipe laying techniques.

PRIOR ART

Publication US2005/0180820 discloses a method and a device for anchoring a pipeline to the seabed. This prior art provides general background for the invention herein, including anchoring a pipeline using a pile that is affixed to the seabed and is connected to a clamp attached to the pipe. The publication focuses on the collar on the pipeline to which a clamp is engaged.

Publication WO1999/01638 discloses an apparatus and a method for supporting a pipeline. The method refers to stove piping and to two part collars able to support the flow line during pipe lay. WO99-01638 has no suggestion about the reeled lay method and problems related to the reeled lay method.

Publication WO2007/010102 illustrates when it could be useful to anchor a pipeline. The publication discloses a method for regulating lateral buckling of a pipeline by applying a lateral force at regular intervals along the pipeline.

U.S. Pat. No. 4,364,692 concerns a buckle arrestor useful especially for the reeled pipe lay method. Designs of known buckle arrestors may include a flange collar or a shoulder welded to the pipe (see column 1, lines 43 to 68 and the cited U.S. Pat. No. 3,768,269). U.S. Pat. No. 4,364,692 underlines that known buckle arrestors are not consistent with the reeled lay method and instead proposes a rod wound around the outer wall of the pipe to serve as a buckle arrestor, which may be used in a continuous lay process reeled lay method. U.S. Pat. No. 4,364,692 and other prior art known to Applicant do not disclose welding a collar to a pipeline prior to reeling the pipeline on a reel.

BACKGROUND OF THE INVENTION

A flowline is a pipeline for flow of fluids and hydrocarbons which is used for connecting a wellhead situated on the seabed to a sea surface installation. The flowline is generally comprised of two main parts. The riser extends from the surface installation to the seabed and touching the seabed at a location called the touch down zone. The shape of the riser is typically a catenary line. A flowline extends along the seabed from the touch down zone to the wellhead. A flow line may also consist of a pipeline extending from one well to another well.

Usually, several wells and their respective flowlines are connected via respective risers to the same surface installation. Environmental conditions (wind, hydrodynamic loads, wave and current) exert forces upon the flowlines and the risers and may cause the flowlines to move. Due to the number of flowlines and subsea devices, the movement of one flowline can cause considerable damage to other subsea equipment. Connections, for example, at the end termination of the flowline and the well head are not designed to support excessive forces. To reduce or avoid any damage to the flowline and the subsea equipment, it is recommended to anchor the flowline on the seabed at specific location(s).

Another example of an action which anchoring of the flowline improves is buckling of the flowline. Due to variations of the pressure and the temperature of hydrocarbons transmitted through a flowline during its lifetime, the flowline may extend itself in the longitudinal direction due to the heat of the hydrocarbon and shrink at the cooling due to absence of the hydrocarbon. This phenomenon is longitudinal buckling. In consequence, forces are exerted on the end termination at the well head, and movement of the pipe in the touch down zone may cause damage because of friction with the seabed. In order to limit the longitudinal buckling, it has been proposed in U.S. patent application Ser. No. 11/995,296 corresponding to PCT/FR/06101676 to affix the end of the flowline opposite to the end connected to the wellhead.

Lateral buckling, may also occur along the flowline. As illustrated in publication WO2007/010102, a wave shape may be imposed on the flowline in order to control lateral buckling of a flowline. The wave is formed by anchoring the line at regular intervals along the flowline.

In a known process for anchoring a flowline, the flowline is anchored generally during its laying operation. The location of the anchoring point is predetermined before the laying operation. A device for anchoring a flowline generally comprises a foundation on which the flowline is to be attached. The foundation is of a known type, installed in known manner by one of suction applied to the foundation at the seabed, a driven pile or a gravity base for the foundation. The device further comprises a clamp mounted around the flowline at predetermined lengths along the line. Further, some means connect the flowline to the pile, for example, a cable or a chain. The clamp around the flowline must resist pulling forces which are quite strong in at least one of an axial and a longitudinal direction. Thus, anchoring the flowline should not rely on gripping force or friction between the pipe and the clamp. In order to resist forces exerted on the flowline, the clamp is preferably engaged with a collar or other fixture that is attached and, usually in a reeled lay method, butt welded between the pipe sections. The collar has a recess or other fixture on which the clamp is mounted.

Typically, the collar is butt-welded to a pipe, and typically to ends of sections of the pipe at predetermined lengths along the flowline. In a stove piping method (a J-lay method), individual pipe sections are assembled on the vessel and each sections is attached to the preceding section as the pipe is laid. This method requires periodically stopping the pipelaying in order to weld an additional pipe section to the flowline. This requirement makes it is easy to butt weld a collar between the ends of two pipe sections without adding additional steps. However, applying a collar to a pipe is quite different in the reeled lay method, because the sections of pipes had been welded before the full flowline length is placed on the vessel (in a factory called a "spoolbase"). The pipe lay is then of the reeled flowline and is carried out without stopping and in a continuous manner. The pipeline is unwound from a reel. To add a collar to that unreeling flowline would require stopping the pipe laying, cutting the flowline, and welding or forging a collar to the line. The time required to lay a flowline would be considerably increased.

One can imagine pre-installing a collar at selected predetermined lengths along the flowline prior to winding it on a reel. However, it is not possible to do this without affecting the reelability of the flowline. One of the parameters to be considered for the reelability is the thickness of the outer diameter of the pipe. The variations caused by the thickness induced "rigid" portions at the collars would affect the reelability and may cause ovality of the flowline (e.g. from sharper bends at a collar), which is well known to initiate buckling phenomena.

Taking this problem into account, a subsea device that is intended to be connected to the flowline, such as a collar, a buckle arrestor, etc. are typically mounted on the outer surface of the pipe after the unreeling operation and therefore are attached to the flowline on the vessel.

In order to save time during a pipe laying operation, a new buckle arrestor design has been developed. Instead of mounting a collar before the laying, a "reelable buckle arrestor" has been proposed. U.S. Pat. No. 4,364,692 refers to the reeled pipe method and the problem that arises with a known buckle arrestor. A known buckle arrestor for rigid pipe is a shoulder welded onto the outer surface of the rigid pipe. It is explained that this kind of buckle arrestor is not adapted for continuous reeled pipelaying because the buckle arrestor can not be installed before reeling without affecting the reelability of the pipe. Known buckle arrestors (shoulder) are replaced by a rod wound around the pipe. Such prior art clearly demonstrates that a person skilled in the art would never have welded a collar having a shoulder onto a rigid pipe to be laid by the reeled lay method.

SUMMARY OF THE INVENTION

It is an object of the invention to provide a continuous flowline of a rigid subsea pipeline with devices for anchoring the flowline to the seabed.

A further object is to provide such a continuous flowline which is reeled and/or spooled.

Another object of the invention is to provide such a flowline wherein an anchoring device, particularly an anchoring collar, need not be installed on the pipeline or flowline only as the respective section of the flowline is about to be laid or delivered subsea, but instead to be able to install anchoring devices on the flowline at a manufacturing location. Thereafter the flowline with the anchoring devices thereon can be spooled and delivered to an installing apparatus, for example, to a pipeline installing vessel and wherein the flowline may be deployed and installed using the reeled lay method.

Another object of the present invention is to attach, preferably by pre-welding, a collar on a rigid section of a flowline prior to spooling or reeling the flowline.

Another object is to attach a collar including a clampable fixture to a pipe section prior to reeling the pipeline.

An object of the invention is to enable a flowline anchoring collar to be installed on a rigid, reeled flowline, which flowline is to be installed subsea, and particularly at the seabed, wherein the flowline may be anchored to the seabed by means of the collar thereon.

A flowline of a pipeline for which with the present invention is used is comprised of a plurality of pipe sections relatively short in length. Each of the pipe sections is itself of conventional design for transmitting hydrocarbon along its length, and may be insulated and reinforced as conventional flowline is to accommodate the subsea conditions at the seabed. The pipe may be a steel pipe with covering layers. The pipe sections have a specified radial thickness. A preferred length of the pipeline section might for example be the selected spacing between anchoring devices between neighboring pipe sections along the length of the flowline. Adjacent ends of successive pipe sections of the pipeline may be butt welded together.

It is preferable to supply some fixture on the flowline at which the flowline may be acted upon, and in a preferred embodiment may be clamped. According to the invention, that fixture is preferably in the region along the flowline where the sections are butt welded. The clamp would then be connected to an anchor position for the flowline.

As noted above, it is known to butt weld an anchoring collar between the ends of adjacent pipe sections. But the collar includes a radially outward fixture, protrusion or shoulder shaped to be acted upon, and preferably to be clamped by a clamp connected to the anchor. For the reasons discussed above, such a protrusion typically interferes with proper or at least desirable reeling of the pipeline and may lead to ovality or buckling.

The present invention also makes use of an anchoring collar that is butt welded between adjacent flowline sections. The collar has a fixture, protrusion or shoulder protruding outward and a device acts upon the collar, e.g., a clamp device that is clamped to that protrusion or shoulder.

Technical features of the collar, including the dimension of the clampable fixture, protrusion or shoulder, does not affect the reelability of the pipe during reeling operation and thus the collar and the method of installation are consistent with use of the reeled lay method.

The dimension of the shoulder is adapted to be engaged with a removable clamp, which may be able to support pulling forces up to about 200 tons. During the pipe lay, a clamp is installed around the collar. The main advantage of the invention is that time is saved during pipe lay as the collar is reeled. The steps of cutting, and welding are avoided. The fixture, protrusion or shoulder of the collar is a narrow step, for example, from 1" to 2" (2.5 to 5 cm) wide along the pipe axis by 1" to 2" in the radial direction thick for a 8" to 10" (20 to 25 cm) outer diameter pipe to avoid a problem of buckling.

In order to avoid interference with proper reeling and the potential for ovality of the pipe, each of the flowline sections has an external layer or jacket. It is there for insulation and as an anti-corrosion layer. The jacket has a radial thickness outward from the exterior surface of the pipe section such that the outer diameter of the pipe jacket is greater than the outer diameter of the fixture, protrusion or shoulder on the collar. The thickness of the jacket is a matter of choice as required at the particular installation.

The jacket extends along the length of each pipe section, but in one preferred embodiment terminates near to and may terminate over the adjacent end of the butt welded collar. However, in the one preferred embodiment, the jacket preferably terminates short of and does not overlap and provides longitudinal space on one or both sides of the fixture, protrusion or shoulder on the collar. The fixture, protrusion or shoulder is then an interruption of the rigid coating of the pipeline. But the interruption is only at the collar, which is a relatively shorter length than the rigid material coated flowline.

In an alternative embodiment, the fixture, protrusion or shoulder may have the jacket extending over it. Then the portion of the jacket initially covering the fixture, protrusion or shoulder must be removed prior to the protrusion or shoulder being acted upon or clamped.

In order for the collar not to interfere with the flow of hydrocarbon through the pipeline, the collar that is butt welded to the ends of pipe sections has the inner diameter of the pipe sections. Preferably, the collar also has the outer diameter of the pipe sections without the jacket. Consequently, the clamping fixture, protrusion or shoulder projects radially outward of the collar and therefore radially outward of the exterior of the pipe sections.

The jacket over the flowline section is of greater radial height than the radial height of the fixture, protrusion or shoulder. Because the fixture, protrusion or shoulder is shorter in radial height than the jacket over the flowline, when the completed flowline is reeled or spooled, a continuous uniform reel of pipe is created without sharp bends that would occur at an outward protrusion that protrudes beyond the outer surface of the pipeline. Thus, the flowline of the invention may include collars for anchoring the flowline at the seabed which collars include fixtures, protrusions or shoulders that protrude radially outwardly of the collar and the pipe, without the resulting protruding fixture, protrusion or shoulder interfering with proper reeling and therefore permitting the flowline to be reeled and spooled and enabling the flowline to also be unreeled from the releasing platform, e.g., on a moving vessel, by the continuous reeled lay method.

Other objects and features of the present invention are described below in connection with the accompanying drawing Figures which illustrate an embodiment of the invention, and in which:

BRIEF DESCRIPTION OF THE DRAWINGS

FIG. 1 shows a fragment of a flowline including two sections thereof butt welded to an anchoring collar between the pipe sections;

FIG. 2 is a longitudinal cross-section through a collar of the invention;

FIG. 3 illustrates the collar apart from the pipeline;

DESCRIPTION OF A PREFERRED EMBODIMENT

Figure 4:
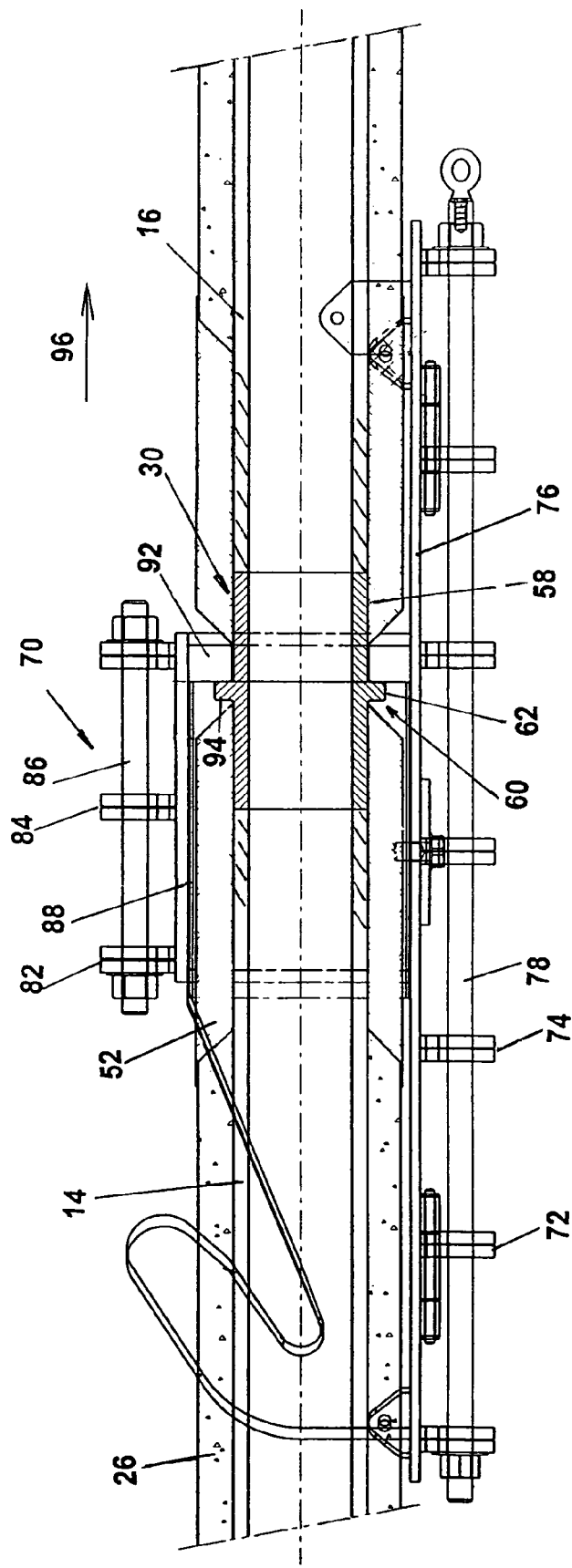
FIG. 4 illustrates a clamp and collar which are associated.

A flowline for transmission of hydrocarbon in a subsea environment in a particular installation may be several miles or kilometers in length. The line is comprised of individual pipe sections, like sections 14 and 16. A typical section of pipe of the reeled lay method flowline is typically of a length of 12 meters or 24 meters. A typical pipe section has an outer diameter in the range of 10-45 cm. This is a preferable size for handling the sections and welding them to adjacent sections before the flowline is reeled.

The flowline is assembled from many pipe sections connected in series which provides an open flow path 20 for hydrocarbon including oil or gas, which is extracted at a particular subsea installation. Each pipe section is essentially identical. For example, the pipe section 14 and the pipe section 16 might be part of a conventional single layer, rigid steel, subsea flowline. This conventional design is well known to those skilled in the art. The pipe sections have a thickness from the interior to the exterior of the metal pipe in the range of about 6 mm to 40 mm, dependent upon the requirements of the installation where the pipe is used, e.g., upon the characteristic of the product to be transmitted, the depth of the seabed, etc.

Outward of the metal pipe, each pipe section 14, 16 is conventionally coated with a jacket 26. It is usually comprised of several layers, including one for insulation. The jacket is typically of a polymer or of more than one. The jacket has a thickness in the range of 20 to 100 mm, for example. That is thick enough to substantially insulate the pipe section, yet thin enough to enable the pipe section to be reeled on a spool or reel and for the pipe sections and the flowline to be unreeled when a pipelay vessel for the flowline arrives at the location where the flowline is to be laid on the seabed by the reeled lay method. This jacket is additionally thick enough (at least locally) to have at least as great an outer diameter as the outside diameter of the fixture, protrusion or shoulder on the below described anchoring collar, and preferably the jacket has a slightly greater diameter.

An anchoring collar 30 for being clamped and thereby anchored to the seabed, for anchoring the flowline to the seabed, is comprised of the axial direction pipe portion 32 and a protrusion 62 which are a stiff, rigid and of short length. The collar conventionally would have a length of 50 cm and is made of steel.

The collar preferably has the same inner diameter as the adjacent pipe sections 14 and 16, so that neither the collar nor the adjacent butting ends of the pipe sections may interfere with the flow of hydrocarbon or may have an edge that might produce turbulence in the hydrocarbon flow or may on which a buildup of material, such as paraffin wax, might occur at the inner surfaces at 34.

The collar 32 also has an outer surface 36 that is preferably at the same outer diameter as the exterior 38 of adjacent pipe section 14 and 16, although the outer diameter of the collar exterior 36 may be different than the outer diameter of the exterior 38 of the pipe.

The coating jacket 26 over the pipe sections 14, 16 extends over the end regions of the collar. There is a later added section 52 of the jacket usually referred to as "field joint coating" that extends onto the collar. But for ease of assembly, the jacket is divided, having a main part 39 that does not extend all the way to the collar and an end 48 that is spaced back from the end of the collar.

The collar is installed where needed along the flowline. This is typically at only some of the attachments between pipe sections. Sometimes a collar may be needed at a location along a preformed pipe section. In that situation, the pipe section is cut and the collar is attached into the pipe section. If it is not known at the flowline assembly stage where collars will be required, they are installed between pipe sections at regular intervals.

The collar 30 has opposite ends 41, 42 which are attached to respective ends 44, 46 of adjacent pipe sections 14 and 16. A preferred attachment mode is by butt welding of the end of the pipe sections to the ends of the collar in order to integrate the pipe sections and the collar and form a flowline that can be reeled, unreeled and withstand the pressures and forces of the use of the flowline for transport of hydrocarbon, typically at elevated temperatures and often at elevated pressure. Butt welding of pipe sections including butt welding of collars to pipe sections, is well known in the art.

The shorter length jacket section 52 is internally and externally sized and shaped like the adjacent jacket layer, has an end that is shaped and profiled to mate with the adjacent end of the jacket, has an end region 54 which extends over the end 38, 42 of the collar, and is typically tapered inward toward the collar thereby defining a smooth transition over the exterior of the pipe to the collar. The tapered end regions 54 of the jacket 52 at both pipes 14 and 16 leave exposed a region 58 along the length of the collar at which a clampable fixture 60 is exposed so that it may be acted upon, and in the illustrated embodiment, that means clamped by a cooperating clamp 70 (FIG. 4).

Figure 6:
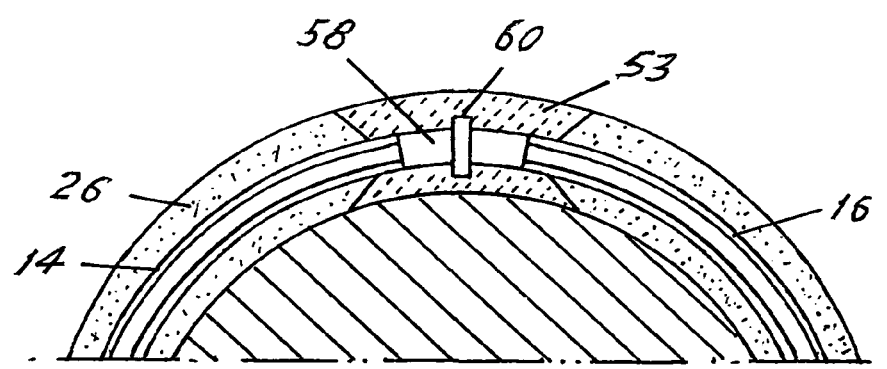
FIG. 6 illustrates an alternate embodiment of flowline wound on a reel and with the collar covered by a jacket.

In the alternative embodiment of FIG. 6, there is a single short length jacket section 53 that extends between the jackets 26 on the two adjacent pipe sections and over the fixture, protrusion or collar 60, 62. The section 53 may be in one or more lengths. That jacket section 53 covers each of the pipe sections and the collar. The sections 53 of the jacket or at least that part of it over the protrusion 60, is removed to provide access to the fixture, protrusion or shoulder 60 prior to acting on it, e.g., installing a clamp thereon.

The fixture 60 is illustrated as a protrusion or shoulder midway along the length of the collar but other shape and configuration fixtures, which are, for example clampable by the clamp for clamping to the collar and for being anchored to the seabed at spaced locations along the flowline, may be provided. The fixture configuration should not include a groove or recess in the collar, which would reduce the thickness of the collar to less than the thickness of the pipe section, or any other configuration that might weaken the collar and perhaps cause the flowline to buckle. A particular installation may include an alternative connection to the collar, rather than clamping to the collar, e.g., resting against the protrusion or fixture 60 or otherwise engaging it, for example.

The illustrated fixture 60 is a single radially outward protrusion or shoulder on the collar. It is typically 1" to 2" (2.5 cm to 5 cm) in the longitudinal direction and has the same radial dimension range above the exterior 58 of the collar for a typically 4" to 18" (10 cm to 45 cm) internal diameter pipe section. The significant feature of this fixture or collar in the present invention is that its outer diameter at 62 with a jacket or layer on the fixture is smaller than the outer diameter of the jacket 26 on the adjacent pipe sections. When the collar is butt welded to the adjacent pipe sections and the jacket 26, 52 is in place, the height of the protrusion 60 is at most at and typically preferably radially below the radial height of the exterior of the jacket on the pipe section. As illustrated in FIG. 6, when the completed flowline with the butt welded collars is reeled on a reel or spool, the collar and the fixture, or protrusion or shoulder thereon does not protrude outward beyond the pipe jacket thereon, and so the protrusion or shoulder does not deform the flowline, which might cause ovality. In other alternatives, the protrusion or shoulder has a smooth transition to the collar or perhaps two half shells are mounted over the shoulder to make an easier transition in outer diameter when on the reel.

The jacket parts 52 at the ends of the pipeline extend sufficiently close to the fixture or protrusion 60 that as the pipe is reeled on a reel, the pipe does not collapse or develop ovality at the transition from the jacket to the collar, as might occur if too great a length of the collar were exposed and uncovered by a thicker jacket. Preferably, the inclined outer surface of the jacket parts prevents a sharp drop off or edge between each jacket and the collar, which also might cause an undesirably sharp bend in the pipe and might cause ovality. Further, the end regions 54 of the jacket are spaced sufficiently from the fixture or protrusion 60 to permit a clamp to engage the fixture. Alternatively in FIG. 6, the jacket section 53 extends over the protrusion or the shoulder 60 and is removed prior to installing the clamp. The presence of the jacket section 53 will better prevent pipe collapse during reeling.

There are a plurality of the clamps 70 as shown in FIG. 4, each for engaging a respective fixture, protrusion or shoulder 60. Each clamp 70 is anchored via an appropriate tether, line, chain or otherwise to an anchor (not shown) which is anchored to the seabed.

Anchoring arrangements are known in the art, for example, Publication US 2005/0180820. A preferred configuration of a clamp for clamping to a collar in the flowline, and which is connectable to an anchoring base or foundation, is described with reference to FIG. 4 hereof.

The clamp 70 to be clamped to the anchoring collar is comprised of two half shells which are clamped over the jacketed pipe sections 14 and 16, their jackets 26 and 52 and the collar 30. The two half shells include flange portions 72, 74, et al. which are held together and define a pivot hinge by the hinge pin 78. The half shells also have flanges 82, 84, et al. which align when the half shells are closed in the clamping position and are held by the pin 86. The clamp has a larger inner diameter, long section 88, which encircles the jacket 26, 52 with an inner diameter that is about equal to the outer diameter of the clamped jacket 26, 52 of the pipe section. Alternatively, the clamp may consist of two halves bolted together.

A shorter length, smaller diameter cylindrical section 92 of the clamp has an inner diameter that is also the outer diameter of the collar exterior surface 58. As the fixture, protrusion or shoulder 60, 62 projects out from the collar surface 58, the cylindrical section 92 of the clamp abuts the opposing side surface 94 of the fixture, protrusion or shoulder, thereby clamps to it and can stop movement of the adjacent sections 14, 16 of the flowline in the longitudinal direction because they are restrained by the clamp 70.

Describing one possible application of the clamp on this flowline, the flowline provided with the anchoring collar and the clamp applied to it is laid on the seabed. To avoid displacement of the flowline in the direction of the arrow 96, the flowline is anchored to the seabed using the clamp 70. Examples of an anchorage are shown for example in the above noted Publication US2005/0180820. One or more chains (not shown) is connected to each clamp, and each chain in turn is anchored to a base or foundation at the seabed. This restrains the clamp, which restrains the pipe sections 14, 16 at the collar 30 against moving in the direction of arrow 96. The butt welds of the anchoring collar with the rigid pipe sections and the abutment relationship of the anchoring collar and clamp can support forces in range of 200 tons.

A reeled flowline is comprised of successive ones of the pipe sections all of which are substantially identical. Anchor collars, which may also be identical to each other, are attached between some adjacent pipe sections. Each anchor collar is butt welded between the opposing ends of the adjacent pipe sections.

The reel or spool of flowline may be created at a manufacturing facility away from the vessel off which the flowline is laid. A reeled pipeline is proposed in FIG. 6. The flowline is created by butt welding together several pipe sections 14 in a spool base. Typically, a length of about 1 km is produced. Collars 60 are included as needed. The thus produced flowline section is wound on a large diameter reel 90. Another length of welded pipe sections is butt welded to the prior length and is also then wound on the reel, and so forth until the desired length flowline has been reeled.

Figure 5:
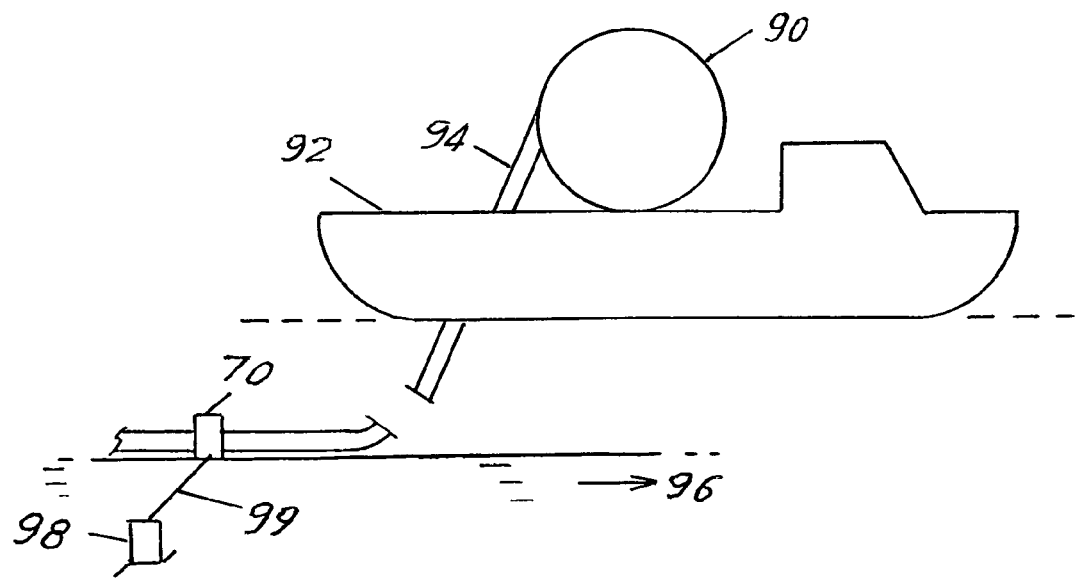
FIG. 5 schematically illustrates unreeling of a flowline.

After reeling of the flowline, as seen in FIG. 5, the reel 90 is deposited on a vessel 92, such as a pipe laying vessel for subsea pipe, and the flowline is unreeled continuously from the reel on the vessel and may be fed through the moon pool of the vessel by the reeled lay method to deliver the flowline at the seabed. The clamps 70 for the flowline are later anchored at the seabed to anchor pipes like 98 by chain 99.

The clamps are applied to the flowline as it is being unreeled and before the pipe has been laid on the seabed. As the flowline is unreeled, each collar will appear. If a clamp is to be attached to the collar, unreeling is halted, a jacket section over the collar, if present, is removed, the clamp is attached, and unreeling is then continued to lay the flowline. The clamps are anchored at the seabed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A combination comprising a flowline comprised of at least two pipe sections and at least one anchoring collar, an anchoring collar being disposed between two adjacent pipe sections;
    each pipe section having an interior space for permitting passage of fluids therealong; each pipe section having an exterior;
    each pipe section having respective opposite attachable ends;
    a jacket over the exterior of each pipe section, the jacket having an inner diameter equal to the diameter of the exterior of each pipe section and an outer diameter outward of the pipe section;
    the anchoring collar being affixed between opposing ends of the two adjacent pipe sections; the anchoring collar having an exterior with an outer diameter less than that of the outer diameter of the jacket;
    a fixture on the exterior of the anchoring collar and protruding radially outwardly therefrom to an outer diameter less than the outer diameter of the jacket, at least one side surface of the fixture being contacted by an engaging device to prevent movement of the two adjacent pipe sections in a direction along the length of the two adjacent pipe sections, the contact of the at least one side surface of the fixture with the engaging device being without connection, by a connector, of the engaging device to the fixture.

2. The combination of claim 1, wherein the jacket extends along at least most of the length of each pipe section.

3. The combination of claim 2, wherein the two adjacent pipe sections have an inside diameter where the pipe sections are attached to the collar, and the collar has the same inside diameter.

4. The combination of claim 2, wherein the fixture comprises a protrusion or a shoulder on the collar.

5. The combination of claim 4, wherein the jacket over the exterior of each of the two adjacent pipe sections extends to and partially covers the exterior of the collar, while not extending to cover the fixture or protrusion on the collar.

6. The combination of claim 5, wherein the jacket includes a main part which extends over nearly the entire length of the respective pipe section and is of a length and is positioned to leave a relatively shorter section of the pipe section located toward the end of the pipe section free of the jacket; and
    a further section of the jacket applied over an end region of the pipe section and extending from the main part of the jacket past the end of the pipe and partially over the exterior of the collar but not extending to interfere with the protrusion or the shoulder nor with the engaging device which is a clamp clamped on the protrusion or the shoulder.

7. The combination of claim 6, wherein the further section of the jacket tapers so as to become narrower in diameter from the end thereof at the main part of the jacket and in the direction toward the collar.

8. The combination of claim 4, wherein the jacket includes a section thereof that extends over the collar and over the shoulder or protrusion, the jacket section being removable from over at least the shoulder or protrusion for exposing the shoulder or protrusion.

9. The combination of claim 2, further comprising a reel or spool, the flowline being reeled on the reel or spool and being unreelable from the reel or spool to lay the flowline.

10. The combination of claim 1, wherein the collar is affixed to the ends of the two adjacent pipe sections by being butt welded thereto.

11. The combination of claim 1, wherein the two adjacent pipe sections have a radial thickness and the collar has the same radial thickness as the pipe sections.

12. The combination of claim 11, further comprising a reel or spool, the flowline being reeled on the reel or spool and being unreelable from the reel or spool to lay the flowline.

13. The combination of claim 1, wherein the fixture is configured to being acted upon by being clamped;
    the combination further comprising
    a clamp that is shaped and configured to receive the fixture on the collar and the clamp being clampable on the fixture or protrusion to thereby clamp the collar, the clamp being the engaging device; and
    a connection between the clamp and seabed for anchoring the collar at the seabed.

14. The combination of claim 1, wherein an anchoring collar is affixed between an end of at least one of the pipe sections and an opposing end of at least two of the pipe sections.

15. In combination, a flowline comprised of at least two pipe sections and an anchoring collar disposed between two adjacent pipe sections;
    each pipe section having an interior space for permitting passage of a fluids therealong;
    each pipe section having an exterior;
    each pipe section having respective opposite attachable ends;
    a jacket irremovably attached to the exterior of each pipe section, the jacket having an inner diameter equal to the diameter of the exterior of each pipe section and an outer diameter outward of the pipe section;
    an anchoring collar affixed between opposing ends of the two adjacent pipe sections; the anchoring collar having an exterior with an outer diameter less than that of the outer diameter of the jacket;
    a fixture on the exterior of the anchoring collar and protruding radially outwardly therefrom to an outer diameter less than the outer diameter of the jacket, the fixture being configured to be acted upon by another object.

* * * * *